United States Patent [19]

Blasiak et al.

[11] Patent Number: 5,711,004
[45] Date of Patent: Jan. 20, 1998

[54] METHOD FOR MINIMIZING MESSAGE INTERRUPTIONS DURING HAND-OFF IN A MULTI-SITE RADIO

[75] Inventors: Darek Blasiak, Chicago; Jeff Pfeil, Bartlett; Paul M. Erickson, Palatine, all of Ill.

[73] Assignee: Motorola, Inc., Schaumburg, Ill.

[21] Appl. No.: 709,419

[22] Filed: Sep. 6, 1996

Related U.S. Application Data

[63] Continuation of Ser. No. 397,307, Mar. 2, 1995, abandoned, which is a continuation of Ser. No. 96,116, Jul. 22, 1993, abandoned.

[51] Int. Cl.$^6$ .................. H04Q 7/00; H04Q 9/00
[52] U.S. Cl. .................. 455/436; 455/520; 455/524
[58] Field of Search .................. 455/33.1, 33.2, 455/34.1, 54.1, 54.2, 56.1, 67.1, 84, 422, 436, 450, 517, 526, 524; 379/60

[56] References Cited

U.S. PATENT DOCUMENTS

| | | | |
|---|---|---|---|
| 4,654,867 | 3/1987 | Labedz et al. | 455/33.2 |
| 4,765,753 | 8/1988 | Schmidt . | |
| 5,058,199 | 10/1991 | Grube | 455/15 |
| 5,067,171 | 11/1991 | Kawano | 455/33 |
| 5,070,536 | 12/1991 | Mahany et al. | 370/84 |
| 5,260,943 | 11/1993 | Comroe et al. | 455/56.1 |
| 5,287,544 | 2/1994 | Menich et al. | 455/33.2 |
| 5,490,288 | 2/1996 | Wiatrowski | 455/54.1 |

*Primary Examiner*—Chi H. Pham
*Assistant Examiner*—Gertrude Arthur
*Attorney, Agent, or Firm*—George C. Pappas

[57] ABSTRACT

A multi-site communication system (100) includes a plurality of communication units (106, 107) roaming among communication sites (108–111). The communication sites (108–111) are controlled by a central controller (100), via repeaters (102–105), and are thereby capable of establishing communication among sites. A method for minimizing message interruptions during a hand-off, of a first communication unit between two sites, includes the step of receiving (200) a message (300) from a second communication unit. During the message (300), which may be delivered at varying information rates, the first communication unit determines (202) the signal quality. If the signal quality of the message is unfavorable, the receiving communication unit determines (204) when the varying information rate of the message is favorable for a hand-off. Lastly, when the varying information rate is favorable for a hand-off, the first communication unit requests (205) the hand-off.

15 Claims, 2 Drawing Sheets

METHOD FOR MINIMIZING MESSAGE INTERRUPTIONS DURING HAND-OFF IN A MULTI-SITE RADIO

This is a continuation of application Ser. No. 08/397,307, filed Mar. 2, 1995 and now abandoned, which is a continuation of application Ser. No. 08/096,116 filed Jul. 22, 1993 and now abandoned.

FIELD OF THE INVENTION

The present invention relates generally to radio communication systems, and more particularly to hand-offs in such a system having multiple communication sites.

BACKGROUND OF THE INVENTION

Radio communication systems are well known in the telecommunications art. Such radio communication systems (e.g., Motorola's Advanced Mobile Phone System—AMPS), or Group Special Mobile—GSM) use many base radio sites to provide service to mobile and portable communication units throughout a large metropolitan or rural area.

In a multi-site system with many communication sites, or coverage areas, it is common for a mobile or portable communication unit to travel from the coverage area provided by one site to the coverage area of another site. Thus, when the communication unit travels from one cell to another, while involved in a call, there is need for a process to hand the call off from the first site to the second site.

The prior art includes several hand-off mechanisms based on signal levels and quality, along with noise and interference levels of radio frequency (RF) signals. The RF signals measured are from the first base to the communication unit, from the communication unit to the first base, individually from each candidate second site to the communication unit, and individually from the communication unit to each candidate second site. Each implementation of the prior art uses some subset of these RF signal measurements in order to determine when a hand-off is needed, and which candidate site or sites would best serve as the second site for the communication unit. The problem with the foregoing solution lies in the fact that the request to hand-off is made whenever it is required. That is, the hand-off request is sent even at the expense of interrupting a critical portion of the message, which is the likely result of a hand-off request being sent during a high rate of information transmission.

Accordingly, there exists a need for a method of minimizing message interruption during the time when a hand-off becomes necessary. In particular, a radio communication system that took advantage of periods of low information transmission rates to execute hand-offs would be an improvement over the prior art.

DETAILED DESCRIPTION OF THE PREFERRED EMBODIMENT

Generally, the present invention provides a method for minimizing message interruptions during hand-offs from one site to another in a communication system. A message interruption, sometimes referred to as an audio hole, is any loss of information caused by significant network processing delays that prevent the communication system from executing the hand-off request instantaneously. A message interruption can also be caused by control data that is transmitted via the traffic channel, at the expense of the message currently being transmitted along the traffic channel. Minimizing message interruptions refers to losing as little information, that is contained in the message, as possible. Further, the present invention improves the hand-off for communication units that are half-duplex (i.e., receive only for some or all of the message), as well as full-duplex (i.e., substantially simultaneously receive and transmit messages), to minimize the perceptual impairments of the hand-off.

When a communication unit that is either transmitting or receiving a message, determines, during the message reception or transmission, that the signal quality of the message is unfavorable, it will first determine whether the message is favorable for a hand-off before a hand-off is requested. A message is regarded as being favorable for a hand-off based on it's current information rate. The information rate is considered favorable for a hand-off during a period of time in which the information rate is low, and thus a message interruption is tolerable.

Figure 1:
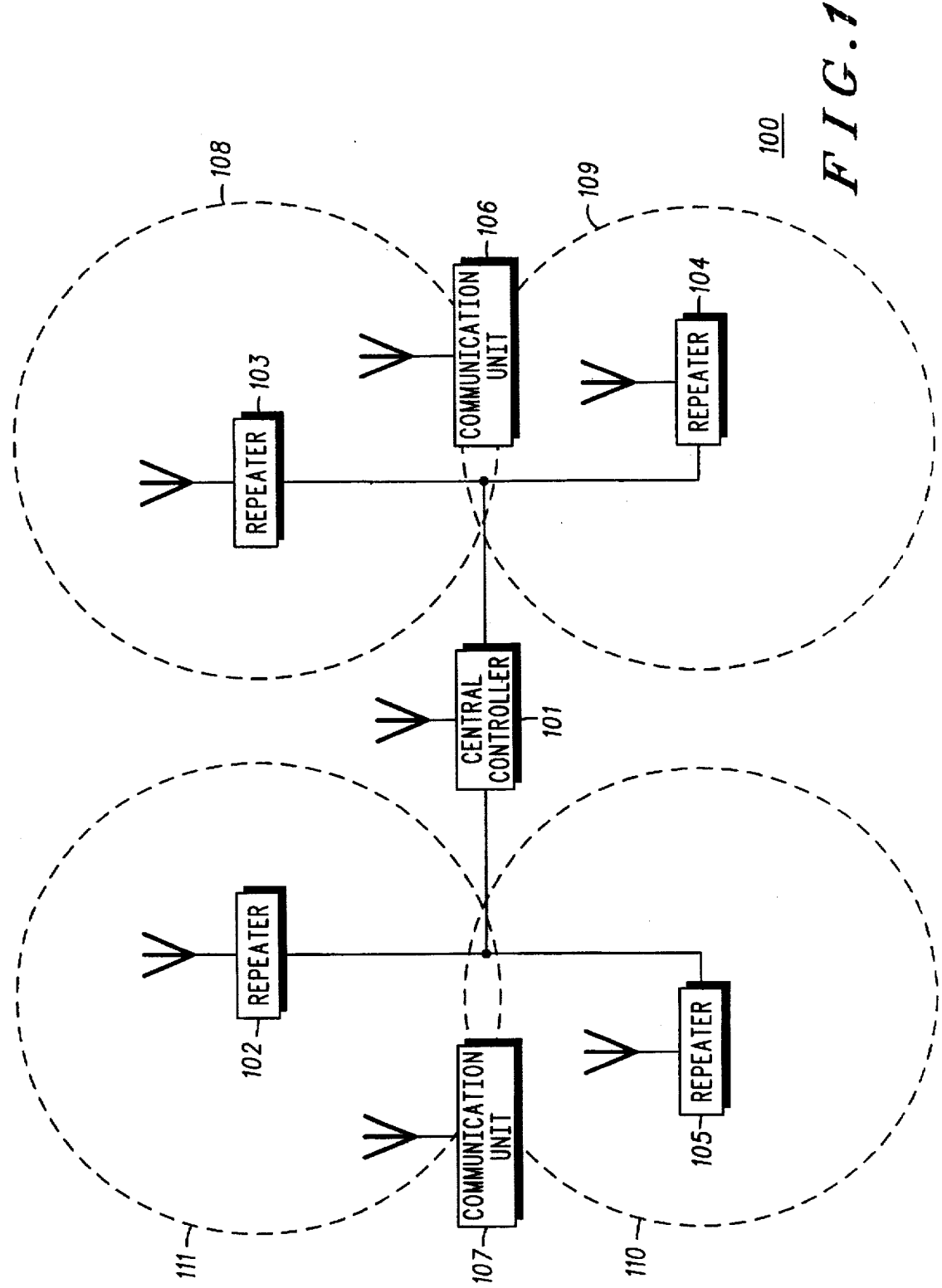
FIG. 1 illustrates a radio communication system, whose major components are well known in the art.

The present invention can be more fully described with reference to FIG.'s 1–3. FIG. 1. illustrates a communication system 100 that includes a central controller 101, a plurality of repeaters 102–105, and a plurality of communication units 106–107. Each of the repeaters 102–105 provide a coverage area 108–111, respectively, wherein communication units can exchange information with the repeater over RF channels.

The communication system 100 may be a trunking system, a cellular system, or a conventional system. The central controller 101 in a trunking system might be a Motorola SMARTNET™ II Trunked Radio Central Controller; in a cellular system, it might be the Mobile Switching Center's switch as offered by Northern Telecom, Siemens, and others; while in a conventional system, it might be a Computer Aided Dispatch (CAD) computer. In all cases, the central controller 101 assigns calls to selected base stations (frequencies), tracks the location of units, resolves conflicts for resources, and checks the authorization of communication units.

The repeaters 102–105 might be radios like Motorola's MICOR™ or MSF 5000™ for trunking or conventional systems, whereas Motorola AMPS™ base site repeaters and equipment would be representative of a cellular system. In all cases, the repeaters work in substantially similar fashion. That is, they receive signals from the communication unit on one of a pair of frequencies, and transmit to the communication unit on the other frequency in the pair. In the case of a telephone call, the repeater may be coupled directly, or indirectly through other equipment, to the public switched telephone network (PSTN)—and ultimately to a telephone—to provide a duplex audio connection between the communication unit and the telephone. In the case of a group call, the repeater re-transmits whatever it receives on one frequency onto the other frequency in the pair.

The communication units 106–107 might be radios like Motorola STX™ portables, or Maxtrac™ mobiles for a trunking or conventional system. Similarly, a Motorola MicroTAC™ flip phone would be representative of a communication unit for a cellular system. In all cases, the communication units work in a similar fashion. When idle, the communication units monitor a control channel for call activity. When active in a call, they transmit the user audio onto one modulated RF carrier and reproduce audio received on the other modulated RF carrier. The modulation of one carrier and demodulation of the other carrier might be substantially simultaneous—referred to generally as full-duplex—as would typically be the case for telephone service in any of the three systems. Likewise, the communication unit might either modulate one carrier or demodulate the other carrier at any moment—referred to generally as half-duplex—as would typically be the case for a dispatch group call.

Figure 2:
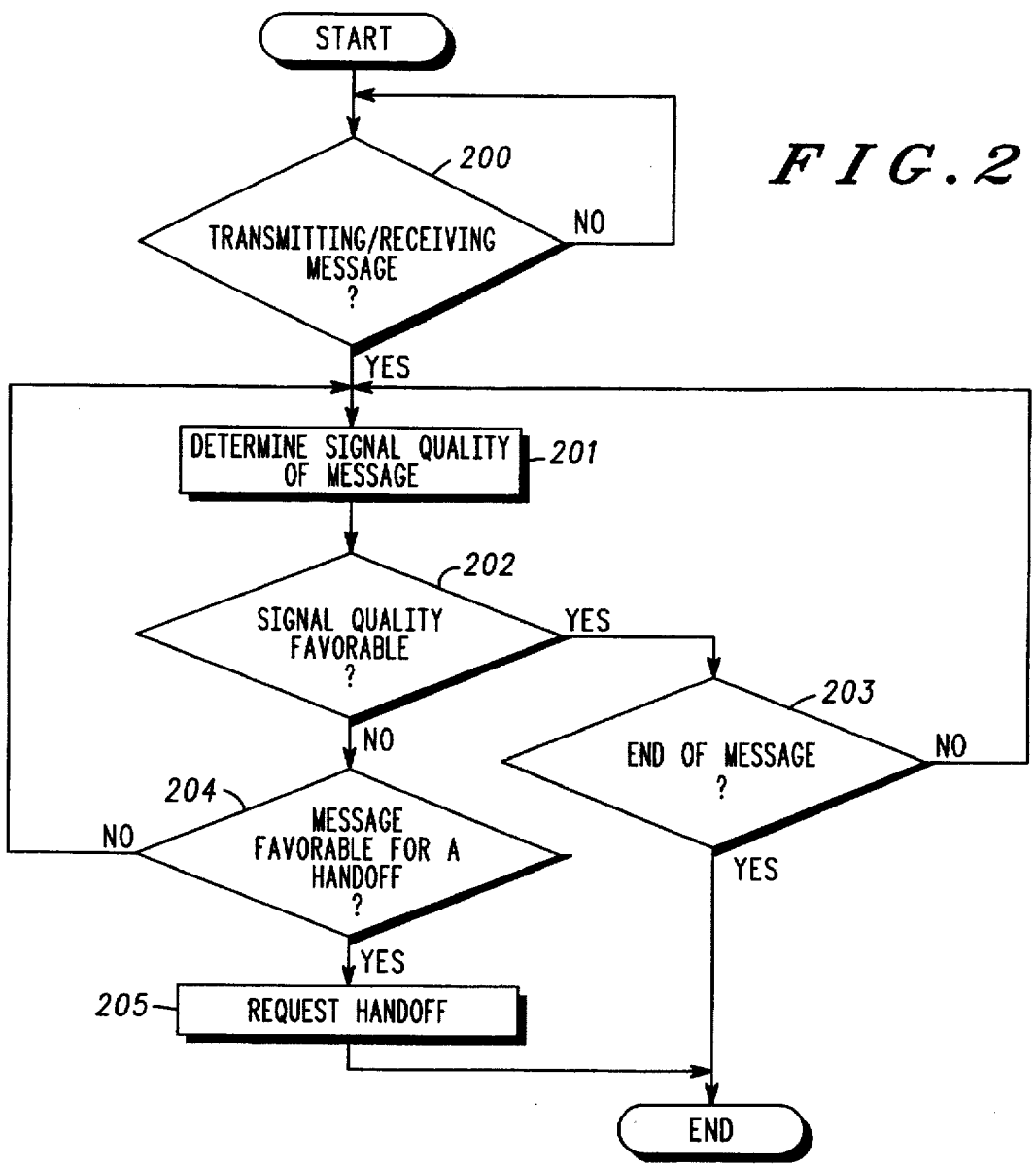
FIG. 2 illustrates a flow diagram depicting the operation of a radio communication unit, in accordance with the present invention.

Regardless of the type of communication system, when a communication unit approaches the fringes—i.e., outer coverage limits—of a repeater's coverage area, a hand-off must occur if communication is to continue. In a preferred embodiment of the invention, the logic diagram of FIG. 2 is employed to minimize communication interruptions when a hand-off becomes necessary. A decision is reached (200) where it is determined whether or not the communication unit is either transmitting or receiving a message. For purposes of this disclosure, a message includes any combination of transmissions that are exchanged between two or more communication units in a communication system. A transmission is a quantity of information that is sent from a single communication unit.

If the radio is neither transmitting or receiving a message, the routine continues to check for this condition. During message transmission or receipt, the signal quality of the message is determined (201)—either continuously or periodically throughout the message. The signal quality of the message is a generic term referring to any metric that in some manner measures the relative strength of the desired signal (i.e., the signal that carries the message) and any interfering signal (e.g., ambient noise or co-channel interferers that are intrinsic to any communication system). Though the present invention is not dependent upon any particular signal quality metric, alternative signal quality metrics include channel bit error rate (BER), received signal strength indicator (RSSI), and/or the carrier to noise plus interference ratio (C/(I+N)).

In the case where a message is received by a communication unit, the signal quality can be determined directly from the message by the receiving communication unit. However, in the case where a message is transmitted to another communication unit, the signal quality of the message might be measured by some other element in the communication system (e.g., the receiving communication unit, a repeater, or the central controller) and relayed back to the transmitting communication unit in some manner. [Alternatively, the transmitting communication unit, if full-duplex, might infer an estimate of the signal quality of its transmission as received at its destination by considering the transmit power and estimated path loss; the path loss being derived by knowing the reverse transmitted power and receive signal strength.]

Once the signal quality is determined, a decision (202) is reached to determine whether or not the signal quality is favorable to continue communication without a hand-off. Signal quality favorability refers generally to the signal quality value being above a particular threshold (referred to hereafter as the signal quality threshold). The signal quality threshold can be either static or variable, i.e., it can be user defined, a function of the current traffic loading on the system, or based on the type of message (e.g., a data message or a voice message). Regardless of the possible variations, the signal quality threshold will typically be set at a level such that reliable communications can be maintained. If the signal quality is favorable, a decision (203) is used to determine whether or not the message has ended. If the message has ended, the routine is exited; otherwise, the routine returns to block 201.

If the signal quality is found to be unfavorable, a decision (204) is reached to determine whether or not the message is favorable for a hand-off. Hand-off favorability refers generally to the condition where the information rate (i.e., amount of information per unit time) is conducive to making a hand-off request without substantive loss of information. That is, the decision to request a hand-off is, in a preferred embodiment of the invention, a function of the current information rate of the message. In particular, the lower the information rate, the more acceptable it would be for a transmitted hand-off request to cause an interruption in the message—and hence, more favorable. This is due to the fact that a message interruption, during a period in which the information rate of the message is low, would result in a relatively insignificant loss of information (e.g., audio holes during a pause between transmissions). Similarly, the greater the information rate, the less favorable it would be to request a hand-off (e.g., audio hole may arrive during a critical portion of the transmission).

If the message is found to be unfavorable for a hand-off—e.g., information rate is above a predetermined threshold—the routine returns to block 201. If the message is favorable for a hand-off, a hand-off is requested (205). The hand-off request message might be sent via the current traffic channel—e.g., in a blank and burst fashion—or via an associated control channel. The repeater or central controller then determines the best candidate site for hand-off, based on information received from the requesting communication unit, as well as other information available to it, as well known in the art. For communication units that are operating in half-duplex mode, the message might well consist of well defined portions, often themselves called transmissions. Each transmission ends with an end-of-transmission (EOT) indicator. An EOT indicator can be any signal or code word (for digital systems) that is present somewhere within the message (or is sent via another channel). The purpose of the EOT indicator is to notify the receiving communication units that the transmitting communication unit has completed it's transmission, in which case the receiving communication units may bid for control of the channel and thus the ability to begin their own transmission. Due to the nature of such a system-humans listening to another's transmission and responding with one of their own—there exists a finite human response time lapse, during which the information rate on the channel is low. That is, upon detecting the EOT indicator, the receiving operator mentally formulates the response, and attempts to do so by requesting to transmit—e.g., by depressing the push-to-talk (PTT) button on the radio. Thus, a typical human response might be on the order of 0.5–2.0 seconds.

In a preferred embodiment for communication units operating in half-duplex mode, a favorable period to request a hand-off—i.e., a window of favorability—might be defined as a time period substantially immediately following detection of the EOT indicator, as later described. The length of this window can be fixed to a predetermined value—by either the system or the user—or can vary depending upon certain characteristics of the current message. For example, if the response times measured during the current message were shorter than anticipated, the window could be narrowed accordingly. Nonetheless, the size of the window of favorability would be on the order of an average response time.

It is important to note that, hand-off requests may, in an alternate embodiment, be permitted outside of the window of favorability, but preferably only in those cases where the signal quality of the message is so poor that the signal degradation is worse than that caused by a message interruption—e.g., an audio hole. That is, the desired likelihood of hand-off requests occurring only during the window of favorability might be selected by choosing the appropriate disparity between the levels of the signal quality threshold inside and outside of the window of favorability. In particular, signal quality threshold values may be variably set for different portions of the message. As an example, hand-offs could be completely disallowed outside of the window of favorability by merely setting the signal quality threshold in that region to an extremely low signal quality level that can never be realistically attained.

In addition, the signal quality threshold could be set to a predetermined value depending on the type of information currently being transmitted. Namely, if the information is pure data, the signal quality threshold could be set to a rather high value regardless of the window of favorability. However, if the information is voice, the signal quality threshold—both inside and outside of the window of favorability—might be less restrictive. Further, the signal quality threshold can be set by either the system or the user. For example, depending on whether or not the user is willing to tolerate some degree of degraded audio, the user might select the point at which hand-offs are forced to occur by adjusting the signal quality threshold level at points away from the window of favorability.

In addition to, or in the alternative, the signal quality threshold might be allowed to vary based on certain performance factors. One such factor might be the length of time that the current transmission has been active. If the current transmission has lasted for a relatively long period of time—e.g., based on some predetermined average—the signal quality threshold might be adaptively raised to accommodate the probability that the need for a hand-off is likely increasing. In like manner, the signal quality threshold level and the window of favorability can be inter-dependently altered to effect an optimal hand-off request point.

For communication units that do not operate in half-duplex mode—e.g., full-duplex—an information rate estimator can be designed to determine suitable periods of time within the message to request a hand-off. As an example, an information rate threshold could be established to compare with the information rate estimate. If the information rate estimate falls below the information rate threshold, the information rate will be considered sufficiently low to allow a hand-off request. Otherwise, a hand-off request would not be permitted. The information rate threshold might be a predetermined value set by either the system or the user. Further, the type of information being transmitted might also affect the information rate threshold—e.g., the threshold may be set to a higher level for pure data than for voice.

Still further, the information rate threshold could be made a function of the signal quality. That is, if the signal quality is poor, it might be beneficial to raise the information rate threshold, thereby permitting a hand-off request during periods of higher information rates. Relative changes in signal quality might also be considered. For example, if the signal quality is falling at a significant rate—though the instantaneous value is above the signal quality threshold—the information rate threshold could be raised in anticipation of a hand-off need in the near future.

Lastly, for messages that consist entirely of voice, pauses between syllables, words, or sentences, might be considered as windows of favorability for a hand-off. It should be noted that, in this context, the determination of an appropriate location for a window of favorability could be made using any type of voice activity detector. For example, in a digital communication system that uses a linear predictive vocoder, the gain term of the analysis window is readily available. This gain term can be monitored and a prediction made as to when a pause of sufficient length might occur, thereby indicating a strong candidate for a window of favorability.

Though block 204 has been discussed primarily from the perspective of a receiving communication unit, it should be recognized as being equally applicable to a transmitting communication unit. That is, each of the aforementioned methods—for positioning the window of favorability and adjusting thresholds—can be utilized by a transmitting communication unit. The only exception lies in the fact that the message being operated on is the one being presently transmitted, not the message being received. Of course, some nuances specific to a transmitting unit would need to be addressed. For example, when a transmitting communication unit is transmitting to multiple receiving communication units, it might be desirable to impose stricter requirements upon the window of favorability to prevent a single message interruption from affecting multiple receiving units. That is, the information rate threshold might be set to a lower level for a transmitting communication unit than it would be for a corresponding receiving communication unit.

Figure 3:
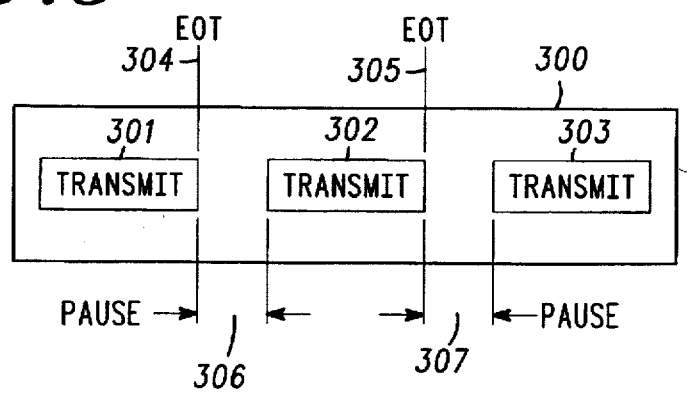
FIG. 3 shows graphical representation of a message, in accordance with the present invention.

To illustrate the half-duplex system signaling discussed above, consideration is given to FIG. 3, where a message (300) is depicted. The message (300) includes message portions (301–303), EOT indicator signals (304, 305), and pause portions (306, 307). The message portions (301–303) might be multiple transmissions from a single unit, or single transmissions from multiple communication units. Likewise, the pause portions (306, 307) might be typical human response time intervals, as earlier described. In a preferred embodiment, the window of favorability for a hand-off begins substantially immediately following the EOT indicators (304, 305), respectively, and ends before the beginning of a subsequent transmission. That is, a preferred time to request a necessary hand-off is during the pause portions (306, 307), when the information rate is low.

In a preferred embodiment, the foregoing technique is implemented by varying the signal quality threshold for the different parts of the message being received. In particular, during transmission periods (i.e., 301–303) the signal quality threshold might be set to a first level (e.g., 13 dB), while the signal quality threshold during pause portions (306, 307) is set to a higher level (e.g., 21 dB). Thus, a signal fade that occurs during a pause—whether transmitting or receiving—is more likely to result in a decision to hand-off than the same signal fade would during a transmission period. In this manner, the signal quality threshold is varied throughout receipt of the message, to ensure that a hand-off that is only marginally necessary—i.e., signal quality between 13 and 21 dB—is not executed during a transmission period. Of course, a very weak signal (e.g., below 13 dB) would, regardless of where in the message it became weak, result in a request to hand-off.

The present invention provides a method for minimizing message interruptions during hand-offs from one site to another in a communication system. Such a method improves upon the prior art by executing hand-offs at a time when the resulting degradation to the message is less critical. For messages that consist primarily of voice, the quality of the audio at locations near the fringes of the coverage areas is dramatically improved since fewer audio holes (i.e., segments of muted audio caused by hand-offs) are perceived by the user. In particular, for certain communication systems, network processing delays might impart audio holes up to 0.5 seconds in duration. Such audio holes are quite noticeable to the user, but are substantially eliminated by this invention.

What is claimed is:

1. In a multi-site, half-duplex, trunked communication system including a first site controller, a second site controller, a transmitting communication unit, and at least one receiving communication unit, a method of minimizing loss of interruptions of a randomly sourced message of unknown duration and varying information rate transmitted over a carrier signal, to cause minimal information loss during a hand-off operation, by any of said at least one receiving unit, from the first site controller to the second site controller, each said at least one receiving unit including a traffic discriminating means for identifying audio holes in the transmission of said message and means for identifying a traffic slow condition, the method comprising the receiving unit performed steps of:

analyzing, by the associated traffic discriminating means, the carrier signal as a function of signal quality to identify a degraded signal condition;

analyzing, by the associated means for identifying a traffic-slow condition, the sourced message, as a function of at least one of its duration and its information rate, to identify a window-of-favorability condition; and performing a hand-off operation, with minimal information loss, on the basis of said degraded signal condition and said window-of-favorability condition.

2. The method of claim 1, wherein the sourced message includes at least one pause indicator signal, and wherein the step of analyzing the sourced message includes the step of detecting a pause indicator signal.

3. The method of claim 1, wherein the message is followed by an end-of-transmission (EOT) indicator, and wherein the step of analyzing the sourced message includes the step of detecting an EOT indicator.

4. The method of claim 1, wherein the step of analyzing the sourced message includes the step of identifying an audio hole exceeding a predefined period.

5. The method of claim 4, further comprising the step of varying the predefined period as a function of the signal quality of the carrier signal.

6. In a multi-site, trunked communication system including a first site controller, a second site controller, a transmitting communication unit, and at least one receiving communication unit, a method of minimizing loss of interruptions of a randomly sourced message of unknown duration and varying information rate transmitted over a carrier signal, to cause minimal information loss during a hand-off operation, by any of said at least one receiving unit, from the first site controller to the second site controller, each said at least one receiving unit including a traffic discriminating means for identifying audio holes in the transmission of said message and means for identifying a traffic slow condition, the method comprising the receiving unit performed steps of:

analyzing, by the associated traffic discriminating means, the carrier signal as a function of signal quality to identify a degraded signal condition;

analyzing, by the associated means for identifying a traffic-slow condition, the sourced message, as a function of at least one of its duration and its information rate to identify a window-of-favorability condition; and performing a hand-off operation, with minimal information loss, on the basis of said degraded signal condition and said window-of-favorability condition.

7. The method of claim 6, wherein the sourced message includes at least one pause indicator signal, and wherein the step of analyzing the sourced message includes the step of detecting a pause indicator signal.

8. The method of claim 6, wherein the message is followed by an end-of-transmission (EOT) indicator, and wherein the step of analyzing the sourced message includes the step of detecting an EOT indicator.

9. The method of claim 6, wherein the step of analyzing the sourced message includes the step of identifying an audio hole exceeding a predefined period.

10. The method of claim 9, further comprising the step of varying the predefined period as a function of the signal quality of the carrier signal.

11. The method of claim 6, wherein the receiving and transmitting communication units are operably coupled for communication in half-duplex mode.

12. The method of claim 7, wherein the receiving and transmitting communication units are operably coupled for communication in half-duplex mode.

13. The method of claim 8, wherein the receiving and transmitting communication units are operably coupled for communication in half-duplex mode.

14. The method of claim 9, wherein the receiving and transmitting communication units are operably coupled for communication in half-duplex mode.

15. The method of claim 10, wherein the receiving and transmitting communication units are operably coupled for communication in half-duplex mode.

* * * * *